United States Patent [19]

Moore et al.

[11] Patent Number: 4,918,624
[45] Date of Patent: Apr. 17, 1990

[54] VECTOR GENERATOR SCAN CONVERTER

[75] Inventors: James M. Moore; James F. Leighton, both of Livermore, Calif.

[73] Assignee: The United States of America as represented by the United States Department of Energy, Washington, D.C.

[21] Appl. No.: 152,900

[22] Filed: Feb. 5, 1988

[51] Int. Cl.⁴ .................... G06F 15/66; G06K 15/00
[52] U.S. Cl. .................... 364/519; 364/518; 340/739; 340/747
[58] Field of Search ............... 340/739, 747; 358/903; 364/200 M.S. File, 900 M.S. File, 521, 523, 519, 739, 518

[56] References Cited

U.S. PATENT DOCUMENTS

| 4,205,389 | 5/1980 | Heartz | 364/521 |
| 4,367,533 | 1/1983 | Wiener | 364/519 |
| 4,458,330 | 7/1984 | Imsand et al. | 364/521 |
| 4,527,918 | 7/1985 | Yamamoto et al. | 400/82 |
| 4,635,212 | 1/1987 | Hatazawa | 364/518 |
| 4,672,459 | 6/1987 | Kudo | 358/257 |
| 4,677,571 | 6/1987 | Riseman et al. | 364/519 |
| 4,688,181 | 8/1987 | Cottrell et al. | 364/521 |
| 4,722,064 | 1/1988 | Suzuki | 364/518 |
| 4,736,330 | 4/1988 | Capowski | 364/518 |

Primary Examiner—Gary V. Harkcom
Assistant Examiner—Raymond J. Bayerl
Attorney, Agent, or Firm—Henry P. Sartorio; Clifton E. Clouse, Jr.; William R. Moser

[57] ABSTRACT

High printing speeds for graphics data are achieved with a laser printer by transmitting compressed graphics data from a main processor over an I/O (input/output) channel to a vector generator scan converter which reconstructs a full graphics image for input to the laser printer through a raster data input port. The vector generator scan converter includes a microprocessor with associated microcode memory containing a microcode instruction set, a working memory for storing compressed data, vector generator hardware for drawing a full graphic image from vector parameters calculated by the microprocessor, image buffer memory for storing the reconstructed graphics image and an output scanner for reading the graphics image data and inputting the data to the printer. The vector generator scan converter eliminates the bottleneck created by the I/O channel for transmitting graphics data from the main processor to the laser printer, and increases printer speed up to thirty fold.

12 Claims, 4 Drawing Sheets

LONG FORM (TWO 16 BIT WORDS)

| 1 0 1 | PP | M | 10 ms BITS OF X OR DELTA X |

| 3 is X | 13 BITS OF Y OR DELTA Y |

SHORT FORM (ONE 16 BIT WORD)

| PP | 7 BITS OF DELTA X | 7 BITS OF DELTA Y |

PP = 00   SET CURRENT POINT ONLY
      01   SET CURRENT POINT THEN PLOT A POINT
      10   NOT USEABLE
      11   DRAW A LINE FROM OLD TO NEW POSITION
M = 0   RELATIVE MODE (DELTA X, Y ARE 2's
        COMPLEMENT NOS.
    1   ABSOLUTE MODE

4,918,624

VECTOR GENERATOR SCAN CONVERTER

The United States Government has rights in this invention pursuant to Contract No. W-7405-ENG-48 between the U.S. Department of Energy and the University of California for the operation of the Lawrence Livermore National Laboratory.

BACKGROUND OF THE INVENTION

The invention relates generally to computer printers and more particularly to high-speed laser printers.

In a large main frame computer, e.g. a CRAY-2 or CRAY-XMP supercomputer, millions of calculations per second are performed. The large amounts of data produced must be output in usable form. Thus, the printer becomes an important component of the computer system. Graphics data is often more difficult to print than text because of the much greater volume of data needed to form the graphic image. Printing of graphics can be a slow and expensive procedure.

In a laser printer a laser beam modulated by an acousto-optical modulator is scanned by means of scanning optics across a photoconductive surface on a rotating drum to produce an image on the drum. The image on the drum is then transferred to paper by a xerographic process. A laser printer is a serial writing device, i.e. one bit of data at a time. This serial data is sent to the acousto-optic modulator which modulates the laser beam. A serializer is used to read out a bit image from memory in parallel mode, e.g. 16 bits at a time, and then serialize the image bits for transmission one bit at a time to the acousto-optic modulator.

The IBM model 3800-3 laser printer is a very high-speed laser printer which has an absolute speed of 3.7 pages per second. Text can be printed at about full printer speed, 3.6 pages per second. However, printing graphics is much slower, at best 7-10 seconds per page because the standard I/O channel is too slow for the voluminous graphics data required to print a page. Therefore it is highly desirable to speed up printing of graphics to approach full printer speed, particularly in a computing environment where large amounts of graphics data are produced.

A number of other printing systems have been developed. U.S. Pat. No. 4,672,459, to Kudo shows a communication terminal apparatus with data format conversion capability for a facsimile machine. U.S. Pat. No. 4,677,571, to Riseman discloses a printing system which converts data to index numbers for a matrix of points representing certain shapes as well as gray scale. U.S. Pat. No. 4,367,533, to Wiener shows an image bit structure and method for increasing size of characters. U.S. Pat. No. 4,635,212, to Hatazawa rotates a print pattern. U.S. Pat. No. 4,527,918 to Yamamoto shows a dual head printer, one for characters and one for plotting graphics. Thus, the prior art does not deal with the problem of reduced printer speed for graphics printing and methods for increasing printer speed to its inherent speed.

SUMMARY OF THE INVENTION

Accordingly, it is an object of the invention to provide method and apparatus to increase speed of printing graphics in a computer system.

It is also an object of the invention to provide method and apparatus to increase printer speed for to near the absolute printer speed.

It is another object of the invention to provide method and apparatus for overcoming limitations in speed of graphics printing caused by a standard I/O channel between a main processor and printer.

It is a further object of the invention to provide method and apparatus for increasing speed of printing graphics in a laser printer.

The invention is a vector generator scan converter, and method and apparatus for increasing printing speed of graphics data using the vector generator scan converter. The vector generator scan converter (VGSC) is a microcoded device which receives vector end points, converts the end points to vectors in a bit mapped graphic image, and outputs the image to the printer. The VGSC is connected from the I/O channel to a raster data input port on the printer which provides a data path to feed to the laser printer's serializer which drives the scanning beam. The graphics data is transmitted from the main processor to the VGSC over the I/O channel in a compressed form in which each vector is represented just by end points to reduce the amount of data which must be transmitted over the data transfer rate limiting I/O channel. The VGSC then reconstructs a graphic image from the vector end points and sends the reconstructed graphic image to the raster data input port of the printer.

PREFERRED EMBODIMENT

Figures 1, 7:
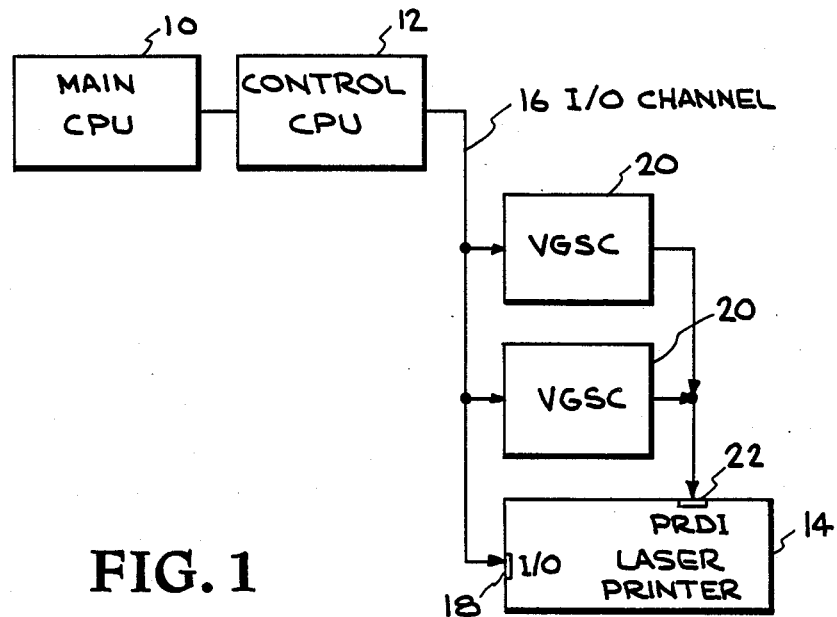
FIG. 1 is a block diagram of a computer system with printer and vector generator scan converter.
FIG. 7 illustrates a long form and short form of compressed block (CB) data format.

As shown in FIG. 1 a main processor (CPU) 10 is connected through a control processor (CPU) 12 to a laser printer 14 by means of a standard I/O channel 16. I/O channel 16 is connected to laser printer 14 through I/O port 18. In a preferred embodiment main processor 10 is a large main frame computer, e.g. a CRAY-2 or CRAY-XMP, control processor 12 is an IBM 4381, I/O channel 16 is an IBM System 370 I/O channel and laser printer 14 is an IBM model 3800-3. The IBM 3800 laser printer is a laser xerographic type printer with an absolute speed of 3.7 pages per second (8.5 inch long pages), and an average speed of 3.6 pages per second. However, in operation, I/O channel 16 limits printing speed for graphics to a much slower rate because I/O channel 16 cannot transmit full graphics data at a rate sufficient to match the printer speed.

Therefore, in accordance with the invention, at least one vector generator scan converter VGSC 20 is connected from I/O channel 16 to a raster data input port (PRDI) 22 of the laser printer 14. Preferably, two VGSCs 20 are connected in parallel from I/O channel 16 to PRDI 22 to keep laser printer 14 running at or very near full speed as the two VGSCs alternate sending graphic pages to PRDI 22. Main CPU 10 produces graphics data in a compressed format. Control CPU 12 determines whether data from main CPU 10 is sent directly to I/O port 18 or to a VGSC 20. The compressed graphics data is thereby sent over I/O channel 16 to a VGSC 20 without overloading the I/O channel 16. The VGSC 20 then reconstructs the full graphics data for input through PRDI 22 to laser printer 14 for plotting. The VGSC 20 reconstructs the graphics data so rapidly that laser printer 14 can operate at or near full speed.

Figure 2:
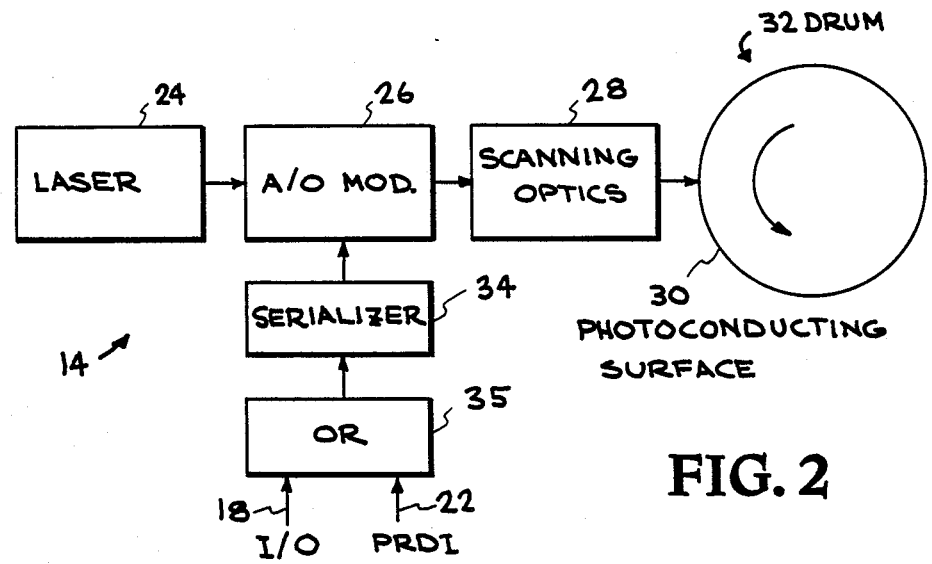
FIG. 2 is a block diagram of a laser printer with a raster data input port.

As illustrated in FIG. 2 laser printer 14 has a laser 24 which produces a laser beam which passes through an acousto-optic (A/O) modulator 26 and is swept by scanning optics 28 over the photoconducting surface 30 of rotating drum 32. Thus, a modulated laser beam is scanned across the drum to produce an image on the drum which is transferred to paper by xerographic processes. A laser printer is a serial writing device, i.e. one bit of data at a time. This serial data is input into the A/0 modulator 26 to modulate the laser beam. Serializer 34 provides the serialized bits to A/0 modulator 26. Serializer 34 reads bit images in parallel, e.g. 16 bits at a time and then serializes the data bits for transmission to A/0 modulator 26 one bit at a time. Data from main processor 10 is normally input to serializer 34 by I/O port 18 from I/O channel 16. PRDI 22 is an additional port provided in laser printer 14 so that reconstructed graphic image data from the VGSC's can be input into serializer 34. Graphic images sent to the PRDI 22 are OR'ed with text pages sent over the normal I/O channel to I/O port 18 in OR gate 35. In a preferred embodiment the VGSC connection, PRDI 22, is 16 data bits parallel with byte parity, the data transfer mode is double full handshake and the required rate is 500 ns/word.

Figure 3:
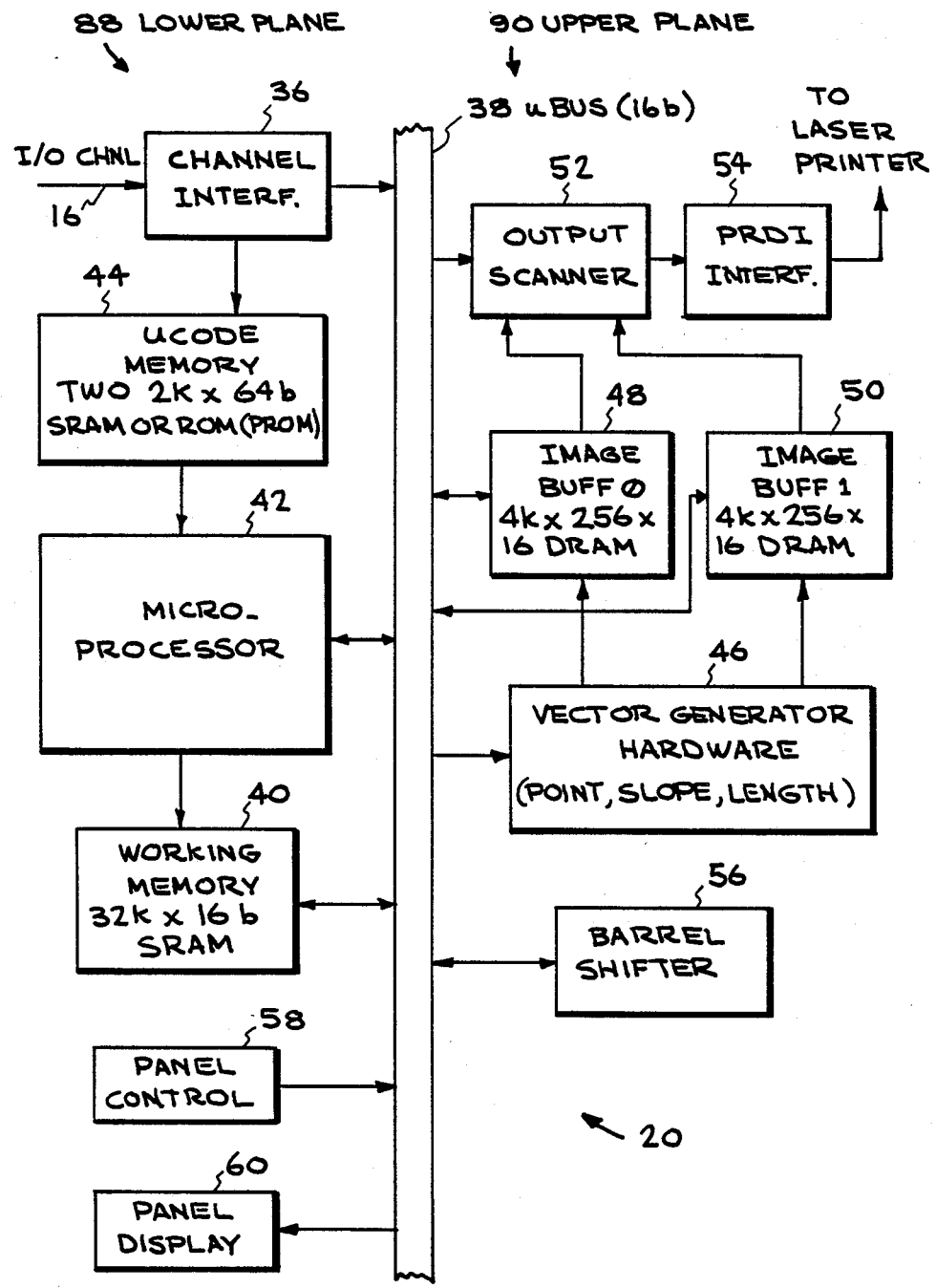
FIG. 3 is a block diagram of the vector generator scan converter.

A block diagram of a VGSC 20 is shown in FIG. 3. Compressed graphics data from the main processor is input into VGSC 20 from I/O channel 16 through channel interface 36. Channel interface 36 provides the protocol for VGSC 20 to talk to the standard I/O channel 16, i.e. handshake signals are exchanged to establish that the main processor is ready to send data and the VGSC is ready to receive data. Data passing through channel interface 36 is transmitted over microbus 38 to working memory 40. Microbus 38 is typically a 16 bit tri-state device in which only one driver and one receiver operate at one time. Working memory 40 is typically a 32 K×16 bit static RAM (SRAM). The compressed data representing an entire page is typically stored in working memory 40. However, if the compressed data is too large, control computer 12 will break it up into segments which do not exceed the working memory capacity. Once control computer 12 sends a signal that all the data has been transmitted, VGSC 20 then converts the compressed data to a full graphic image. The heart of VGSC 20 is microprocessor 42 with microcode memory 44. Microprocessor (microcomputer) 42 is connected to microbus 38 and operates to interpret the compressed data in working memory 40. In a preferred embodiment microprocessor 42 is an AMD 2901 based microcomputer as will be further described. The compressed data provides the vector starting point and end point; microprocessor 42 calculates the slope and length of the vector. Microcode which will be further described stored in microcode memory 44 operates the microprocessor 42. Typically, microcode memory 44 is made of two 2 K×64 b static RAMs; however, microcode memory 44 need only be ROM memory, e.g. a PROM or EPROM, since the microcode is only read during operation of the VGSC.

Microprocessor 42 provides the starting point, slope and length of each vector to vector generator hardware (VGH) 46 which is connected to microbus 38. VGH 46 fully expands each vector into a bit mapped image which is drawn or stored in one of two image buffer memories 48, 50 which are connected to VGH 46. Image buffers 48, 50 are typically 4 K×256×16 dynamic RAMs (DRAM). A pair of parallel independent buffers 48, 50 are preferred so that alternate pages can be stored in separate buffers, although a single buffer could be used. When the graphics data of a complete page has been fully reconstructed in a 4096×4096×1 bit map stored in one of image buffers 48, 50, the fully reconstructed graphics data is output through output scanner (OS) 52 and PRDI interface 54 to the laser printer. Once a page is complete in buffer 48 or 50 microprocessor 42 sends a page release signal to the printer and the printer sends back a signal when ready. Output scanner 52 then reads out the entire image in either one of image buffers 48 or 50 and passes the image data through interface 54. Interface 54 has a FIFO storage which stores sixteen 16 bit words and acts as a buffer to equalize the rates of the printer and the reading rate of output scanner 52 (which is somewhat faster). Thus the printer reads the graphics data in blocks.

The OS 52 includes means for obtaining data from an image buffer memory in a predetermined pattern. The IBM 3800 printer actually uses a pair of rotating 18-sided mirrors to scan two laser beams over the drum, in order to limit the mechanical rotation rate of the mirrors. The second beam scans a line three lines below the first beam. Thus OS 52 reads a word for the first line, then a word for the fourth line, then back to the next word for the first line, etc.

Additional components of VGSC 20 include barrel shifter 56 which provides multiple bit shift capability since microprocessor 42 is not efficient for multiple bit shifts. Also included are panel control 58 and panel display 60.

Figure 4:
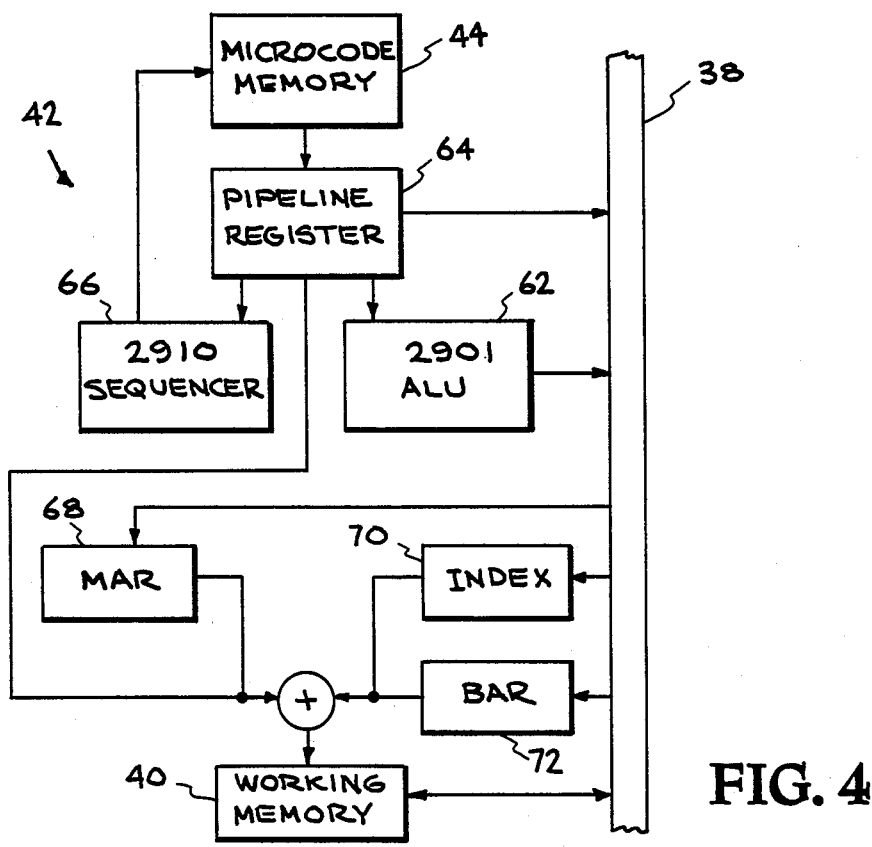
FIG. 4 is a block diagram of the microprocessor in the vector generator scan converter.

Microprocessor 42, as shown in FIG. 4, is based on the AMD 2901 arithmetic logic unit (ALU) 62 which is connected to microbus 38. The ALU 62 is connected to microcode memory 44 through pipeline register 64. An AMD-2910 sequencer 66 is also connected from pipeline register 64 to microcode memory 44. The function of pipeline register 64 is to speed up microprocessor operation and sequencer 66 keeps track of the next instruction. Working memory address register (MAR) 68, index register 70, and base address register (BAR) 72, as well as pipeline register 64 are all connected between microbus 38 and working memory 40 to provide various addressing modes for microprocessor 42 to working memory 40.

Figure 5:
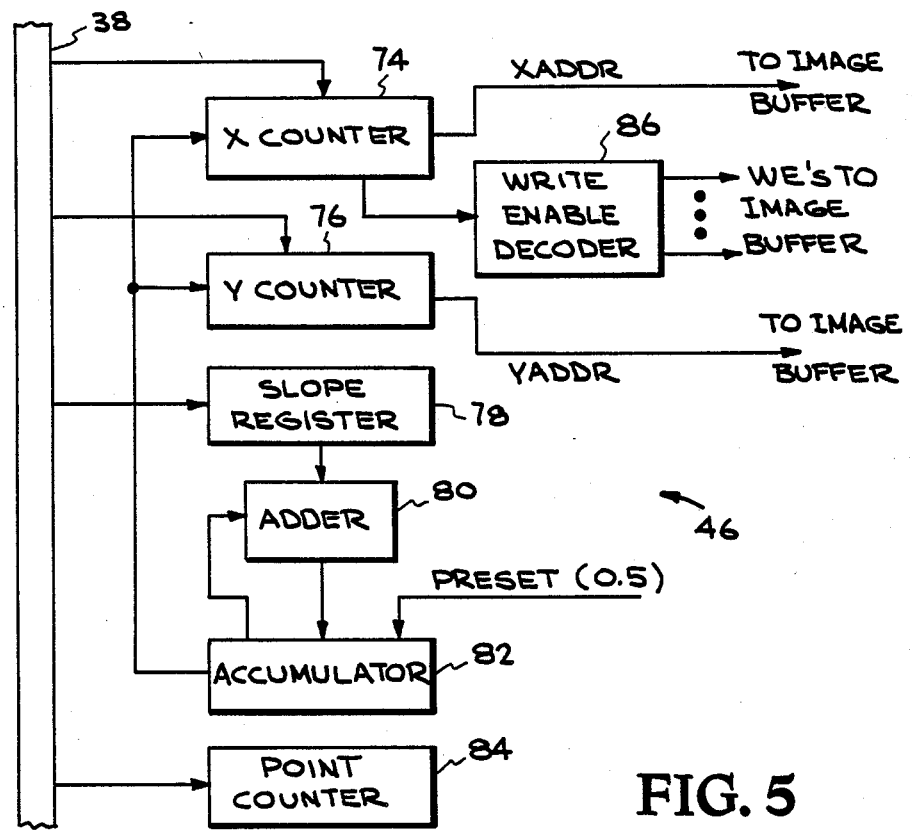
FIG. 5 is a block diagram of the vector generator hardware in the vector generator scan converter.

Vector generator hardware (VGH) 46 is illustrated schematically in FIG. 5. VGH 46 has an X counter 74, Y counter 76 and slope register 78 which are connected to microbus 38 and receive the initial values of X, Y and the vector slope respectively, from microprocessor 42. The slope register 78 is connected to one input of adder 80 whose output is connected to accumulator 82. Accumulator 82 is also connected back to the second input of adder 80. Accumulator 82 is also connected to X counter 74 and Y counter 76 and increments these counters in a manner to produce a series of points to reconstruct the vector, as will be further explained. A point counter 84 is also connected to microbus 38 to indicate when the VGH 46 is busy and when it has finished a vector.

Figure 6:
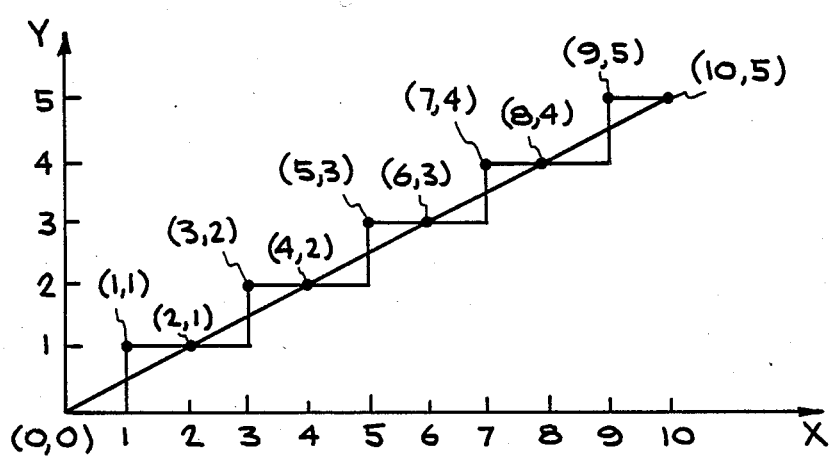
FIG. 6 is an illustration of the reconstruction of a graphic image of a vector by the vector generator hardware.

For illustrative purposes of explaining the operation of VGH 46, a simple example will be utilized, with reference to FIG. 6. A vector is to be drawn from starting point (0,0) to end point (10,5). This vector data could be supplied to microprocessor 42 either as start and end points, or as start point and values delta X, delta Y. The laser printer prints 240 points/inch (the dots are actually large enough so they overlap to form a good quality line); the units in the example are chosen as 10 and 5 points respectively. The microprocessor first determines which coordinate axis is the longest; here it is X. The long coordinate provides the number of points used to construct the vector; thus the vector in FIG. 6 will be constructed of 10 points. This number of points is set in point counter 84 which is a down counter; when counter 84 counts down to zero, all points in the vector have been drawn and VGH 46 has completed the particular vector and is ready to start on a new vector.

Microprocessor 42 calculates the vector slope delta Y/delta X=5/10=0.5. The initial values X=0, Y=0, slope=0.5 are set in X counter 74, Y counter 76, and slope register 78, respectively. A PRESET input sets the accumulator to the initial value 0.5; this value is chosen so that the reconstructed vector better fits the desired vector by making steps at the midpoint rather than at the end of segments. The accumulator overflows when a value equal to or greater than 1 is reached; i.e. the accumulator only stores fractional values. Because the vectors are reconstructed with reference to the long axis, the slope is always a fraction less than one. The accumulator sends count signals to X counter 74 and Y counter 76 in the following manner. Every point sends a signal to increment the counter that corresponds to the long axis (here the X counter) while the other counter (here the Y counter) is only incremented when the accumulator overflows. With reference to FIG. 6, the first point is calculated as follows: the slope value of 0.5 is added to the initial accumulator value of 0.5 to produce the result 1.0 which overflows the accumulator. Thus, only the value 0 remains stored in the accumulator. Since the first step was an overflow, both the X and Y counters are incremented by 1 so the point (1,1) is produced. To get the second point, the slope value is again added to the accumulator (now 0) to produce the value 0.5 which is then stored in the accumulator. Since 0.5 does not overflow, only the X counter is incremented, but the Y counter is not, so the point (2,1) is produced. Following in this manner, the X counter is incremented every step, while the Y counter is incremented only every other step until the final point (10,5) is reached. At this time, point counter 84 signals that the vector is complete.

VGH 46 is now ready for the next vector. New initial values of X, Y, slope are stored, and the accumulator is reset to 0.5. The process has been illustrated with respect to a vector whose long axis was the X-axis. However, a vector with its long axis in the Y-axis will be drawn in exactly the same way with X and Y being interchanged in the above description. Each point of the vector in X and Y counters 74, 76 is written into one of the image buffer memories 48,50. Since only one bit at a time is being written, but an entire 16-bit word of the image buffer memory is addressed at one time, write enable decoder 86 is used to enable only the desired bit and mask out all the other bits. Since the image memory cycle time is 277 ns, VGH 46 has an absolute point rate of 1 point every 277 ns, or 3.60 million points/sec; however, since dynamic RAM is used for image buffer memory to make the memory as compact as possible, and the DRAM must be refreshed periodically, every eighth cycle, the speed is reduced to ⅞ or 3.15 million points/sec.

In a preferred embodiment the VGSC is housed in a 5.25 inch high Standard Logic drawer and requires two SLI planes, a lower plane 88 shown to the left of microbus 38 in FIG. 3 and an upper plane 90 shown to the right of microbus 38. Some operating characteristics of the VGSC and its components are the following:

Xtal clock frequency 36 Mhz
No. of clock phases 10
Major/minor cycle time 0.27777/.027777 us
Micro-bus width 16 bits
Micro-instruction width 64 bits
Micro-instruction cycle time
   Step mode (No branch) 0.27777 us
   All other modes 0.55555 us
Working memory access time 55 ns
Image memory access time 120 ns
Image memory cycle time 277 ns
Vector generator hardware
   Avg point rate (w. refresh) 3.15 M pts/sec
   Abs point rate 3.60 M pts/sec A key part of the vector generator scan converter is the microcode stored in microcode memory 44; this microcode is the instruction set which operates the microprocessor 42. The microcode must perform the following major tasks:

1. Receive vector end points and store them in working memory 40.

2. Set up the vector generator hardware (VGH) 46 to draw the best straight line between the sets of end points in one of the two image buffers 48, 50.

3. Inform the control CPU via a channel "device end" signal and the printer via a "release" signal that a page is ready in an image buffer 48, 50 for printing.

4. Start up the output scanner 52 so that when the printer responds with a ready signal the output scanner reads out the image buffer contents in virtual lock step with the printer's serializer (and hence the laser beam).

Receiving vector end points and storing them in the working memory requires the full attention of the microcomputer 42, i.e. the 2901 based microprocessor must hand carry each 16 bit word from the I/O channel to the working memory. However, both the VGH 46 and OS 52 are direct memory access (DMA) devices with respect to image buffers 48, 50; therefore, microprocessor 42 need only periodically poll VGH 46 and OS 52 to determine when either is ready for a new operation.

A listing of the microcode is contained in the attached microfiche appendix which is herein incorporated by reference.

The preferred embodiment of the invention operates with compressed data; a compressed form of a graphic picture in which the picture is represented just by end points of a vector is produced by the application program in the main computer. This compressed picture rather than the full picture is sent over the standard I/O channel to the VGSC's which recreate the image, thereby avoiding the transmission bottleneck that would occur in the I/O channel if full graphics data were transmitted.

A vector end point format referred to as compressed block (CB) format is a preferred form of representing the data; the VGSC microcode in the attached appendix has been written to process data in CB format. However, other data formats could be utilized with appropriate changes in the microcode. The CB format, illustrated in FIG. 7 may be in either of two forms which can be selected by the application's programmer. The long form utilizes two 16 bit words. The first three bits of the first word are the digits 101 which identify the long form format. The next two digits are the operation code designated PP which may take the three values 00, 01, and 11 (10 is excluded for reasons which will be apparent with reference to the short form). The most useful code is 11 which indicates to draw a line from the old to the new position. The next bit designates the mode: M=0 specifies relative mode, i.e. the change from the previous position, and M=1 designates absolute mode, i.e. the actual coordinate. The last ten bits of the first word are the 10 most significant bits of X (if absolute mode) or Delta X (if relative mode). The first three bits of the second word are the three least significant bits of X or Delta X and the last 13 bits of the second word are the value of Y or Delta Y. The short form utilizies a single 16 bit word of which the first two bits are the same operational code PP. The value 10 is not used so that the short form cannot be misinterpreted as the long form if the third bit is a 1. The short form is used only in relative mode. The next seven bits are the value of Delta X and the last seven bits are the value of Delta Y. The alternate short form saves space for short vectors. Since in the long form X and Y are each 13 bits long, $2^{13}$ points per axis are available. However, the printed pages are $8\frac{1}{2} \times 11$ (Y×X) and in the Y direction half inch margins are provided on each side so that only $7\frac{1}{2}$ inches are available. The printer prints 240 dots per inch, therefore, in the Y direction only 1800 points ($7\frac{1}{2} \times 240$) and in the X direction 2640 points ($11 \times 240$) are required.

Changes and modifications in the specifically described embodiments can be carried out without departing from the scope of the invention which is intended to be limited only by the scope of the appended claims.

What is claimed is:

1. A vector generator scan converter, comprising:
   input interface means for receiving compressed graphics data;
   a microprocessor connected to the input interface means;
   a working memory connected to the microprocessor;
   a microcode memory connected to the microprocessor and containing a set of instructions for operating the microprocessor, including receiving and storing the compressed graphics data in the working memory, and calculating vector slopes and lengths from the compressed data;
   a vector generator means connected to the microprocessor for constructing vectors from vector starting points, slopes and lengths received from the microprocessor to produce a full graphic image from the compressed graphics data;
   at least one image buffer memory connected to the vector generator means for storing the full graphic image produced by the vector generator means;
   output interface means responsive to the microprocessor for outputting the full graphic images from the image buffer memory;
   wherein the vector generator means comprises:
   an X counter for storing a value of an X-coordinate of a vector;
   a Y counter for storing a value of a Y-coordinate of a vector;
   a slope register for storing a value of a vector slope;
   an adder having one input connected to the slope register;
   an accumulator connected to the output of the adder and being connected to a second input of the adder, the accumulator being connected to the X and Y counters to increment the counters to reconstruct a vector image.

2. The converter of claim 1 comprising two image buffer memories connected in parallel to the vector generator means for storing alternate pages of graphic images.

3. The converter of claim 1 wherein the output interface means comprises an output scanner for reading an entire image from an image buffer memory in a predetermined pattern and interface means which stores portions of the image read by the output scanner until read by the laser printer.

4. The converter of claim 1 wherein each image buffer memory is a DRAM.

5. The converter of claim 1 wherein the working memory is a SRAM.

6. The converter of claim 1 wherein the microprocessor includes an AMD-2901 arithmetic logic unit.

7. The converter of claim 6 further comprising a pipeline register between the microcode memory and the arithmetic logic unit.

8. The converter of claim 7 further comprising an AMD-2901 sequencer connected from the pipeline register to the microcode memory.

9. A computer-printer system, comprising:
   a main processor which produces graphics data in a compressed format as vector end points;
   a control processor;
   a high speed laser printer having an I/O port;
   a standard I/O channel connecting the main processor and control processor to the laser printer I/O port;
   a raster data input port in the laser printer;
   at least one microcoded microprocessor based vector generator scan converter connected from the I/O channel to the raster data input port to receive vector end points over the I/O channel, convert the end points to vectors in a bit-mapped graphic image, and output the bit-mapped graphic image to the raster data input port of the laser printer;
   wherein each vector generator scan converter comprises:
   input means for receiving compressed graphics data from the main processor over the I/O channel;
   a microprocessor connected to the input means;
   a working memory connected to the microprocessor;
   a microcode memory connected to the microprocessor and containing a set of instructions for operating the microprocessor, including receiving and storing the compressed graphics data in the working memory, and calculating vector slopes and lengths from the compressed data;
   a vector generator means connected to the microprocessor for constructing vectors from vector starting points, slopes and lengths received from the microprocessor to produce a full graphic image from the compressed graphics data;

at least one image buffer memory connected to the vector generator means for storing the full graphic image produced by the vector generator means;

output means responsive to the microprocessor for outputting the graphic images from the image buffer memory to the laser printer through the raster data input port;

wherein the vector generator means comprises:

an X counter for storing a value of an X-coordinate of a vector;

a Y counter for storing a value of a Y-coordinate of a vector;

a slope register for storing the value of a vector slope;

an adder having one input connected to the slope register;

an accumulator connected to the output of the adder and being connected to a second input of the adder, the accumulator being connected to the X and Y counters to increment the counters to reconstruct a vector image.

10. The system of claim 9 comprising two vector generator scan converters connected in parallel from the I/O channel to the raster data input port for processing alternate pages of graphics data.

11. A vector generator scan converter, comprising:

input interface means for receiving compressed graphics data;

a microprocessor connected to the input interface means, the microprocessor including and AMD-2901 arithmetic logic unit;

a working memory connected to the microprocessor;

a microcode memory connected to the microprocessor and containing a set of instructions for operating the microprocessor, including receiving and storing the compressed graphics data in the working memory, and calculating vector slopes and lengths from the compressed data;

a pipeline register between the microcode memory and the arithmetic logic unit;

a vector generator means connected to the microprocessor for constructing vectors from vector starting points, slopes and lengths received from the microprocessor to produce a fully graphic image from the compressed graphics data;

at least one image buffer memory connected to the vector generator means for storing the full graphic image produced by the vector generator means;

output interface means responsive to the microprocessor for outputting the full graphic images from the image buffer memory.

12. The converter of claim 18 further comprising an AMD-2910 sequencer connected from the pipeline register to the microcode memory.

* * * * *